(12) United States Patent
Ma et al.

(10) Patent No.: US 9,944,238 B2
(45) Date of Patent: Apr. 17, 2018

(54) WIRING PROTECTION DEVICE IN A VEHICLE

(71) Applicant: Ford Global Technologies, LLC, Dearborn, MI (US)

(72) Inventors: Yoyo Ma, Nanjing (CN); Wei Xu, Nanjing (CN); Peter Zhang, Nanjing (CN); Raymond Fu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/489,394

(22) Filed: Apr. 17, 2017

(65) Prior Publication Data

US 2017/0305367 A1    Oct. 26, 2017

(30) Foreign Application Priority Data

Apr. 22, 2016    (CN) .......................... 2016 1 0258611

(51) Int. Cl.
*H02G 3/04*    (2006.01)
*B60R 16/02*    (2006.01)
*H02G 3/30*    (2006.01)

(52) U.S. Cl.
CPC ....... *B60R 16/0215* (2013.01); *H02G 3/0456* (2013.01); *H02G 3/30* (2013.01)

(58) Field of Classification Search
CPC .. H02G 3/30; H02G 3/32; H02G 3/36; H02G 3/383; H02G 3/385; H02G 3/40; H02G 3/0456; H02G 3/0437; H02G 3/04; B60R 16/0215; B60R 16/00; B60R 16/0207

USPC ... 174/68.1, 68.3, 72 A, 482, 486, 490, 135, 174/138 R; 248/68.1, 49

See application file for complete search history.

(56) References Cited

U.S. PATENT DOCUMENTS

| 5,401,905 | A | 3/1995 | Lesser et al. | |
| 6,323,428 | B1 * | 11/2001 | Takano | H02G 11/006 174/117 F |
| 6,930,244 | B1 * | 8/2005 | Nebel | H02G 11/00 174/486 |
| 7,042,738 | B2 * | 5/2006 | Tsubaki | B60R 16/0215 174/72 A |
| 7,140,070 | B2 | 11/2006 | Yuta et al. | |

(Continued)

FOREIGN PATENT DOCUMENTS

DE    4230636 A1    3/1994
DE    19539457 A1    5/1996

(Continued)

*Primary Examiner* — Angel R Estrada
(74) *Attorney, Agent, or Firm* — Mohr IP Law, PC; Vichit Chea

(57) ABSTRACT

A wiring protection device in a vehicle comprises a support base and a support branch. The support base includes a fixed end and a free end opposite the fixed end and extending away from the fixed end, and a guide rail. The support branch is slidably connected to the support base and includes a first end, a second end and a main body. The first end is adjacent to the free end of the support base at a retracted position, and at least a portion of the main body extends outside the support base at a use position. The extended portion of the support branch and the support base at least partially encloses wiring disposed between a first part and a vehicle part at the use position.

20 Claims, 5 Drawing Sheets

(56) References Cited

U.S. PATENT DOCUMENTS

| | | | |
|---|---|---|---|
| 7,306,481 B2* | 12/2007 | Tsukamoto | H02G 11/00 174/135 |
| 7,364,224 B2 | 4/2008 | Wozniak | |
| 7,829,789 B2* | 11/2010 | Yamaguchi | H02G 3/0468 174/68.1 |
| 8,263,863 B2* | 9/2012 | Young | H02G 3/045 174/135 |
| 2005/0082813 A1 | 4/2005 | Seong | |

FOREIGN PATENT DOCUMENTS

| JP | 2007302128 A | 11/2007 |
|---|---|---|
| KR | 100299618 B1 | 6/2001 |

* cited by examiner

WIRING PROTECTION DEVICE IN A VEHICLE

RELATED APPLICATION

This application claims the benefit of Chinese Patent Application No: CN 201610258611.5 filed on Apr. 22, 2016, the entire contents thereof being incorporated herein by reference.

FIELD

The present application relates to vehicle relates to a wiring protection device in a vehicle to protect wiring disposed between a carpet and a vehicle floor.

BACKGROUND

It is well-known that a vehicle includes various electric devices, such as interior lights and electric switches. These electric devices are connected with a power source or a controlling device via wiring. The wiring is usually concealed underneath interior decoration panel of a vehicle, for example, disposed between a vehicle floor and a carpet adjacent to the vehicle door so as to be invisible and thus providing good appearance.

In the conventional techniques, however, the wiring is usually laid directly between a vehicle's floor and a carpet near the vehicle doors. Thus, the carpet above the wiring may collapse due to lack of support when a passenger opens the door, touches or presses on a piece of carpet above the wiring. Further, since the wiring has no firmed structure, the wiring may become loose or shaking when in use and gets worn when departing from the designed position.

SUMMARY

To solve the above-described, the invention provides a vehicle a protection device to protect wiring disposed between a carpet and a vehicle floor.

According to one aspect, a wiring protection device in a vehicle is provided. The wiring protection device comprises a support base and a support branch. The support base includes a fixed end and a free end opposite the fixed end and extending away from the fixed end, and a guide rail. The support branch is slidably connected to the support base and includes a first end, a second end and a main body. The first end of the support branch is adjacent to the free end of the support base at a retracted position, and at least a portion of the main body extends outside the support base at a use position. The portion of the support branch extended outside the support base and the support base at least partially encloses wiring disposed between a first part and a vehicle part at the use position.

In one embodiment, the support branch may be configured to maintain its shape during sliding process.

In another embodiment, the support base may include a first support segment and a second support segment including the free end. The guide rail is positioned on the second support segment.

In another embodiment, at least the second support segment may include a hollow portion as a housing to receive the support branch and the guide rail may be formed by an inner wall of the housing In another embodiment, the guide rail may be disposed inside the second support segment.

In another embodiment, the second support segment of the support base may be curved, and the support branch may be a curved member having a same curvature as the second support segment.

In another embodiment, the first end and the second end of the support branch may include a lock latch, respectively, and the free end of the support base may include a lock catch matching the lock latch.

In another embodiment, the extended portion of the support branch outside the support base and the support base may form a semi-circular ring at a cross-section to restrict movement of the wiring. The extended portion of the support branch outside the support base may be configured to be extended outside the support base at different lengths to accommodate a shape of wiring.

In another embodiment, the wiring projection member may further comprise a sliding block slidably connected with the support branch and configured to slide along the guide rail with the support branch.

In another embodiment, the two ends of the guide rail may include a stop positioned in a path of the sliding block, respectively.

In another embodiment, the vehicle part is a vehicle floor and the first part is a carpet above the vehicle floor.

In another embodiment, the first end may be configured to be outside the support base at both the retracted position and the use position to serve as a handle to facilitate pulling during assembling or dissembling process.

According to another aspect, a wiring protection device is provided in a vehicle to protect wiring between a carpet and a vehicle floor. The wiring protection device comprises a support base and a support branch. The support base includes a connection portion adjacent to a fixed end and to be connected to the carpet, a free end opposite to the fixed end and a guide rail. The support branch is slidably connected to the support base and includes a main body, a first end adjacent to the free end of the support base at a retracted position and a second end opposite the first end. At least a portion of the main body extends outside the support base at a use position. The extended portion outside the support base varies to accommodate wiring disposed between the carpet and the vehicle floor and the extended portion of the support branch and the support base form a border that at least partially enclose the wiring.

In one embodiment, the support base may include a first support segment and a second support segment including the free end. The second segment may include a hollow portion formed as a housing to receive the support branch, and an inner wall of the housing is used as a guide rail.

In another embodiment, the support base may be formed from a bended plate, a cross-section of the support base may have a J-shape. The width of the support base may be configured to cover at least a portion of the wiring along a length of the wiring.

In another embodiment, the support branch may be formed from a bended solid plate, and a curvature of the support branch may be substantially same as a curvature of the support base to facilitate sliding movement between the support branch and the support base.

In another embodiment, the first of the support branch may contact the vehicle floor at the use position.

In another embodiment, the support base and the support branch are made from rigid material.

According to yet another aspect, a wiring protection assembly in a vehicle is provided. The wiring protection assembly comprises a vehicle floor; a carpet; and a wiring protection device disposed between the vehicle floor and the carpet. The wiring protection device includes a support base and support branch. The support base includes a fixed end and a connection portion adjacent to the carpet, a free end adjacent to the connection portion, and a guide rail. The support branch is disposed inside the support base and slidable along the guide rail and includes a first end adjacent to the first end of the support base at a retracted position, a second end and a main body between the first end and the second end. The first end and at least a portion of the main body extends outside the support base at a use position. The extended portion of the support branch and the support base form a border that at least partially encloses the wiring, and a length of a peripheral of the border at a cross section varies as the support branch extends and retracts from the support base to accommodate the wiring.

In one embodiment, the connection portion of the support based is connected to the carpet via adhesive and the first end of the support branch contacts the vehicle floor at the use position.

The wiring protection device of the present disclosure protects wires and support carpet with a support base and a support branch. When installed, the support base functions to protect the wiring between the carpet and the vehicle floor, and support the carpet from collapsing and wobbling due to adversely impacts. At a use position, the support branch and the support base together cover the wiring and form a border for the wiring receiving space. Thus, the support base and the support branch restrain the wire to prevent a displacement from its designated position during to vibration during the vehicle traveling.

DESCRIPTION OF THE DRAWINGS

For a more complete understanding of one or more embodiments of the present invention, reference is now made to the one or more embodiments illustrated in greater detail in the accompanying drawings and described below.

DETAILED DESCRIPTION

Figure 1:
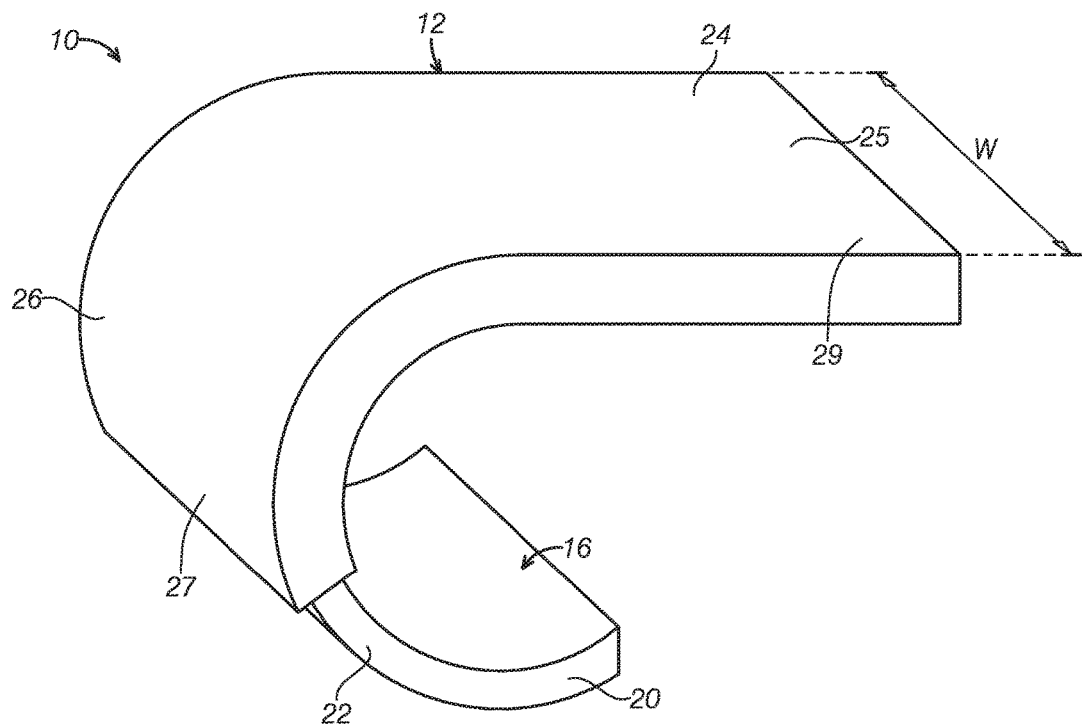
FIG. 1 is a perspective view of a wiring protection device according to one embodiment of the present disclosure.

Detailed embodiments of the present invention are disclosed herein; however, it is to be understood that the disclosed embodiments are merely exemplary of the invention that may be embodied in various and alternative forms.

The figures are not necessarily in scale; some features may be exaggerated or minimized to show details of particular components. As referenced in the figures, the same or similar reference numerals are used to refer to the same or similar components. In the following description, various operating parameters and components are described for different constructed embodiments. These specific parameters and components are included as examples and are not meant to be limiting. Therefore, specific structural and functional details disclosed herein are not to be interpreted as limiting, but merely as a representative basis for teaching one skilled in the art to variously employ the present invention.

Figure 2:
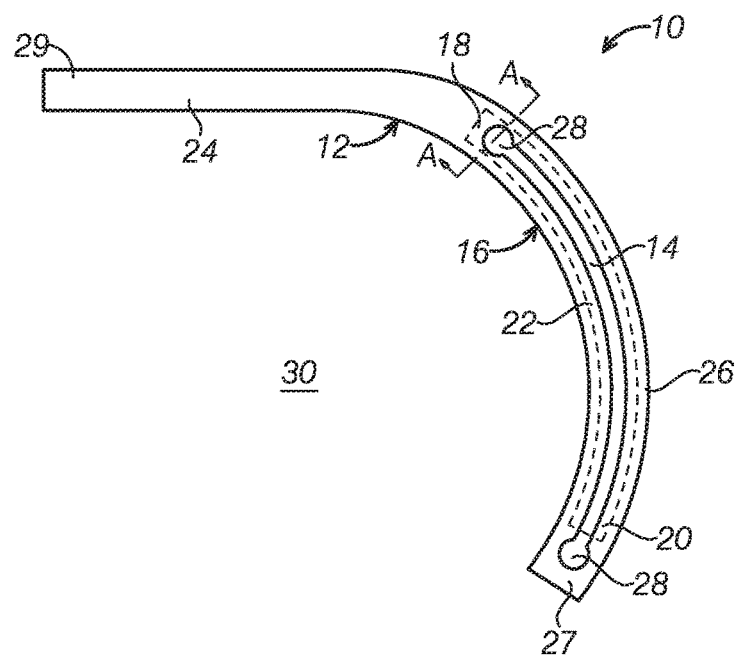
FIG. 2 is a cross-sectional view of the wring protection device in FIG. 1, illustrating a support branch at a retracted position.
Figure 3:
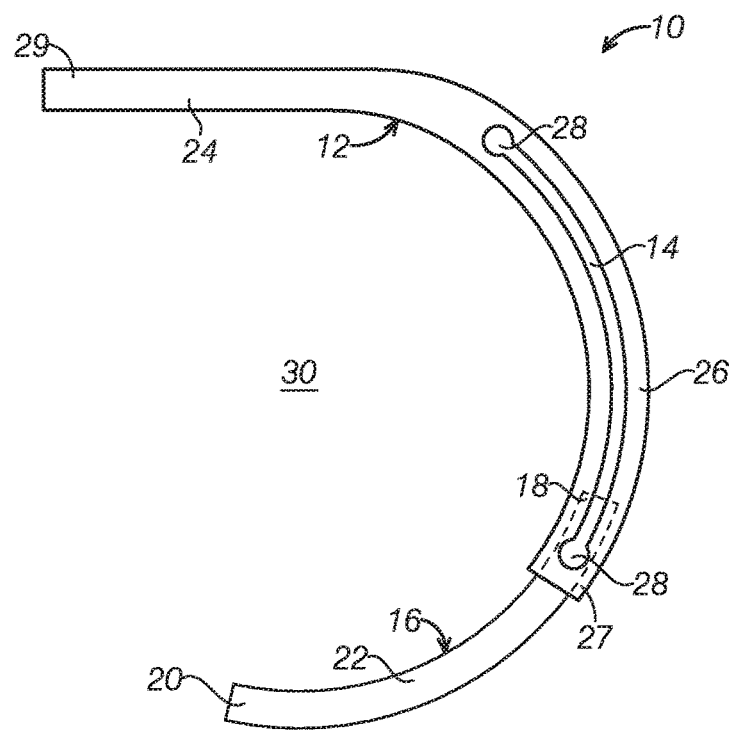
FIG. 3 is a cross-sectional view of the wiring protection device in FIG. 1, illustrating the support branch at a use position.
Figure 7:
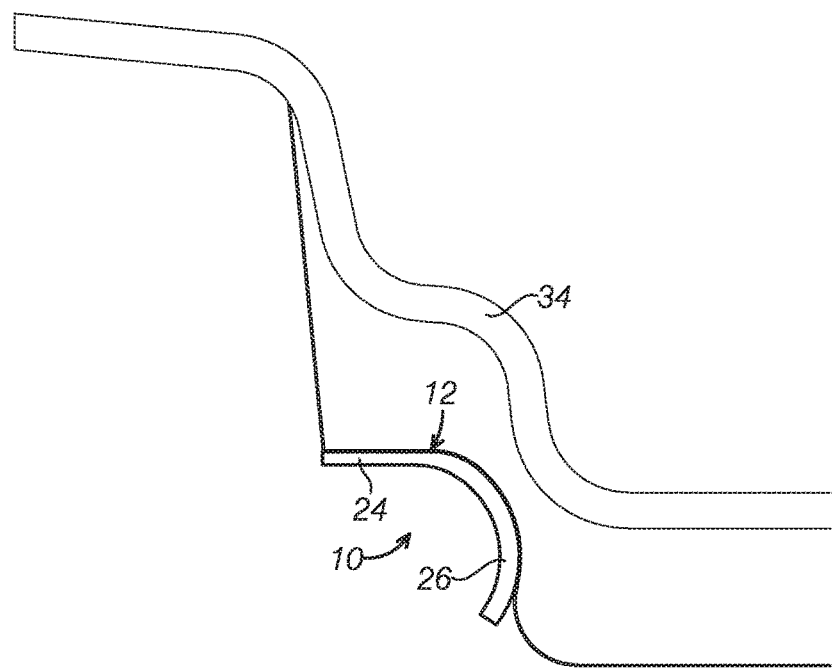
FIG. 7 is a cross-sectional view of an application wiring protection device in a vehicle, illustrating a support branch at a retracted position.

FIGS. 1-3 illustrate a wiring protection device 10 in a vehicle according to one embodiment of the present disclosure. The wiring protection device 10 may be used to protect wiring disposed between a first part and a vehicle part. In one embodiment illustrated in FIGS. 7-8, the first part is a carpet and the vehicle part is a vehicle floor. The wiring protection device 10 includes a support base 12 and a support branch 16 slidably connected to the support base 12. The support base 12 may include a fixed end 29 to be connected with a first part such as a carpet and a free end 27 opposite the fixed end and extending away from the fixed end.

The support branch 16 includes a first end 20, a second end 18, and a main body 22 between the first end 20 and the second end. The main body is slidable and extendable outside the support base 12. A portion of the main body 22 extends outside the support base at a use position as shown in FIGS. 1 and 3. The portion of the support branch extended outside the support base 12 (i.e., the extended portion referred in this application) and the support base 12 at least partially encloses wiring to restrain the movement of wiring 32.

It should be understood that, in some embodiments, the slidable connection between the support branch 16 and the support base 12 may be the configuration that the support branch 16 encircles the support base 12. For example, in one embodiment, the support branch 16 is disposed outside of the support base 12 and slidably connected with the support base 12 while the guide rail 14 is disposed on an outside surface of the support base 12. When the support branch 16 is at a retracted position, the support branch 16 covers as least a portion of the support base 12. In other embodiments, the slidable connection between the support branch 16 and the support base 12 may be the configuration that the support branch is received in the housing or a hollow portion of the support base 12 as shown in FIG. 1-3. As can been seen in FIGS. 1 and 2, the support base 12 is disposed outside the support branch 16 and is slidably connected with the support branch 16, and the guide rail 14 is disposed inside the support base 12. When the support branch 16 is at a retracted position, the support branch 16 may be partially or completely received in the support base 12. At a use position or an extended position, the support branch 16 may extend out from the support base 12 via the guide rail 14. The extended portion of the support branch 16 and the support base 12 at least partially encircle or cover the wiring to protect the wiring and restrain the wiring from movement. Meanwhile, the support branch 16 and support base 12 support the carpet disposed above the wiring protection device 10 to prevent the carpet from collapsing due to an outside force.

The wiring protection device 10 protects the wiring 32 and supports the carpet 34. The wiring protection device 10 includes the support base 12. Upon installation of the wiring protection device 10, the support base 12 can protect the wiring 32 disposed between the carpet 34 and wiring 32, and supports the carpet 34 to prevent the carpet 34 from collapsing or wobbling due to an outside force. Since the support base 12 slidably connects the branch 16, when the wiring protection device 10 is installed, the support branch 16 is slidable on the guide rail 14 to enable the first end 20 of the support branch 16 being extended out from the support base 12. In other words, when the first end 20 of the support branch 16 slides across to the free end 27 of the support base 12, the first end 20 extends out from the interior of the support base 12 in one embodiment or slides across over the support base 12 from an outside surface of the support base 12 in another embodiment. The second end 18, however, remains on the guide rail to prevent the support branch 16 being detached from the support base 12. Thus, the support branch 16 and support base 12 form a border to at least partially enclose the wiring. Further, the support branch 16 and support base 12 together support the carpet 34 to ensure that the carpet 34 would not collapse or shake when the carpet is stepped on or when subject to vibration and further prevent the displacement of the wiring 32 due to contact between the carpet 34 and wiring.

It should be appreciated that, in some embodiments, the first end 20 also may be always positioned outside the support base 20. For example, the first end 20 is always disposed outside the support base 12 to serve as a handle to facilitate pulling during assembling or dissembling process.

According to one embodiment, the support branch 16 may be configured to maintain its shape while sliding along the guide rail 14 and extending from the support base 12. In other words, the support branch 16 may be made from rigid material, such as metal or alloy, to keep its shape unchanged. In another embodiment, the support branch 16 may be made from a flexible material, such as plastic. As such, once installed, the support branch 16 and the support base 12 together support the carpet 34, and form a border of the wiring receiving region to restrain the wiring 32 from movement. The support branch 16 will not be deformed by an outside force which would result in the collapse of the carpet 34 or the displacement of the wiring 32.

In some embodiments, the support branch 16 may be configured as a curved member. The guide rail 14 may be configured to have a shape matching the shape of the support branch 16. Compared to a straight member or flat member, the curved support branch 16 saves space, and also renders the carpet 34 positioned above having a better curved appearance.

Figure 4:
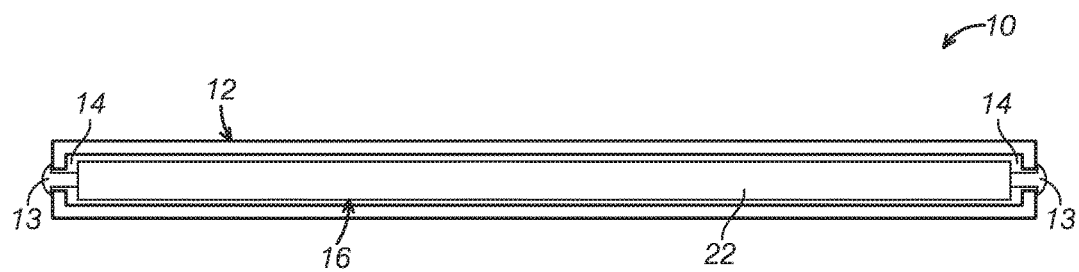
FIG. 4 is a cross-sectional view of the wiring protection device in FIG. 2, viewing from A-A line, illustrating a structure of a guide rail.

Continuing with FIGS. 1-3, the support base 12 includes a first support segment 24 and a second support segment 26 extending from the first support segment 24. In some embodiments, the second segment 26 includes a hollow portion and the guide rail is positioned inside the hollow portion of the second support segment 26. For example, the support base 12 may be formed to include a housing to receive the support branch 16, and the guide rail 14 may be formed by an inside wall of the second support segment 26. In other words, there is no actual guide rail on the second support segment 26 and the inner wall of the second support segment 26 functions as a guide rail. In another embodiment, a guide rail 14 may be disposed on the second support segment 26. For example, as shown in FIG. 4, two ends of the support branch 16 positioned in the support base 12 may include a guide portion 13 protruded from the main body 22. The corresponding two sides of the second support segment 26 of the support base 12 may include a guide slot served as the guide rail 14, respectively, and the guide portion 13 may be configured to be disposed in the guide slot 14 and slidable along the guide slot. It should be understood that, in other embodiments, the support branch 16 may include a guide slot recessed from the two sidewalls and the second support segment 26 may include a protrusion as the guide portion slidable in the guide slot on the support branch.

It should be appreciated that, in some embodiments, the guide rail 14 may be disposed outside surface of the second support segment 26.

Referring to FIGS. 1-3, the second support segment 26 may be curved, and the support branch 16 may be a curved member having a same curvature as the second support segment 26 to facilitate the sliding movement inside the support base 12. In some embodiments, the support base 12 may be formed from a bended plate, and a cross-section of the support base 12 may have a J-shape. A width W of the support base 12 may be configured to cover at least a portion of wiring along a length of the wiring.

Referring to FIG. 2, the support branch 16 may be completely received in the second support segment 26. In another embodiment, for example, a portion of the support branch 16 may be received in the second support segment 26 and another portion may be extended into the first support segment 24. As described in the above embodiment, the support branch 16 may include a portion remained outside of the support base 12 and this portion may be configured as a handle for easily assembling or dissembling.

Figure 5:
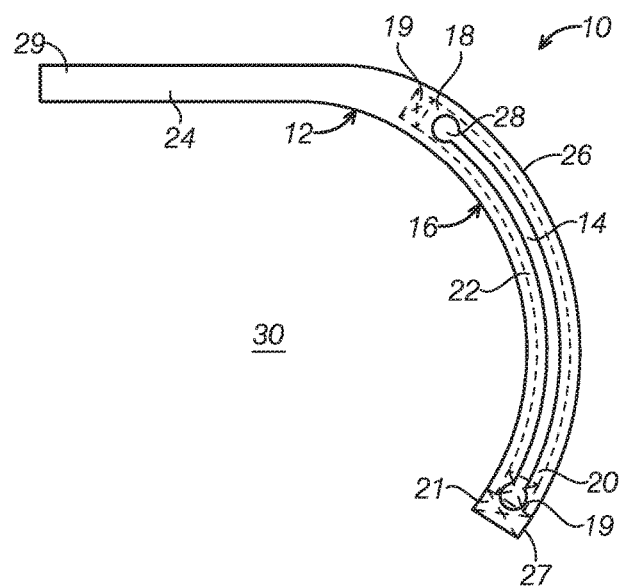
FIG. 5 is a cross-sectional view of a wiring protection device according to one embodiment the present disclosure, illustrating a structure of a lock latch and a latch catch.

Referring to FIG. 5, a locking device of the wiring protection device 10 is illustrated. The lock device may include a lock latch 19 and a lock catch 21 matching with the lock latch 19. The lock latch 19 may be disposed on each end of the support branch 16 (i.e., the first end 20 and the second end 18). The lock catch 21 may be disposed at least on the free end 27 of the second support segment 26. Thus, when the support branch 16 is at a retracted position, the lock catch 21 disposed at the free end 27 of the second support segment 26 locks the lock latch 19 disposed at the first end 20 of the support branch 16 to prevent the support branch 16 from falling off the support base 12. When the support branch 16 is at an extended position or a use position, the lock catch 21 disposed at the free end 27 of the second support segment 26 locks the lock latch 19 disposed at the second end 18 of the support branch 16 to prevent the support branch from sliding back into the extracted position. It should be understood that FIG. 5 only schematically shows the position of the lock latch 19 and the lock catch 21. Any position is possible. For example, the lock latch 19 may be disposed on the main body 22 of the support branch 16. In another example, the support branch 16 may include a plurality of lock latches 19, such as more than two lock latches to lock the support branch 16 at different extended positions. It should be appreciated that the lock latch/lock catch may have any appropriate structures, such as a lock latch/lock core structure, or a bolt/clip slot structure.

Figure 8:
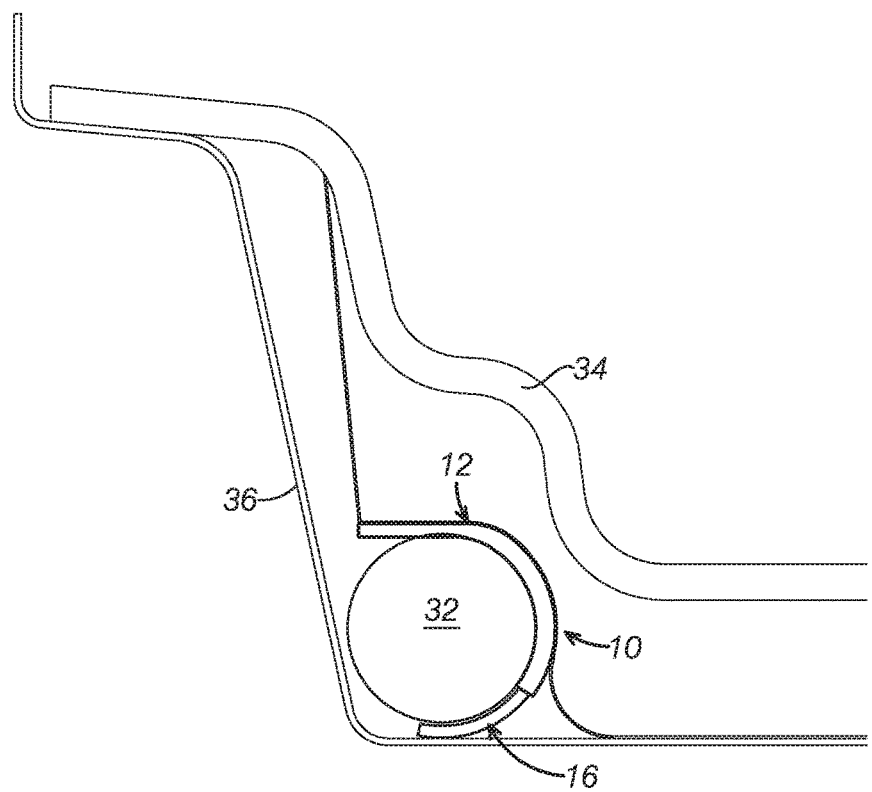
FIG. 8 is a cross-sectional view of an application wiring protection device in a vehicle, illustrating a support branch at an extended position.

Referring to FIGS. 1, 4 and 8, according to an embodiment, the support base 12 and the extended portion of the main body 22 of the support branch 16 together form a cross section with a curve shape or an arc such as a semi-circular shape. The cross section of the support base 12 and the extended portion of the main body 22 as illustrated in FIGS. 1 and 3 may cover at least a half of an outer surface of the wiring 32, which together with the vehicle floor, restrains the wiring 32 from movement and protects the wiring. In another embodiment, the support base 12 and the main body 22 may be configured to surround the wiring completely. Any configurations of the support base 12 and the support branch 16 are possible and the invention is not limited to the illustrated embodiments.

Figure 6:
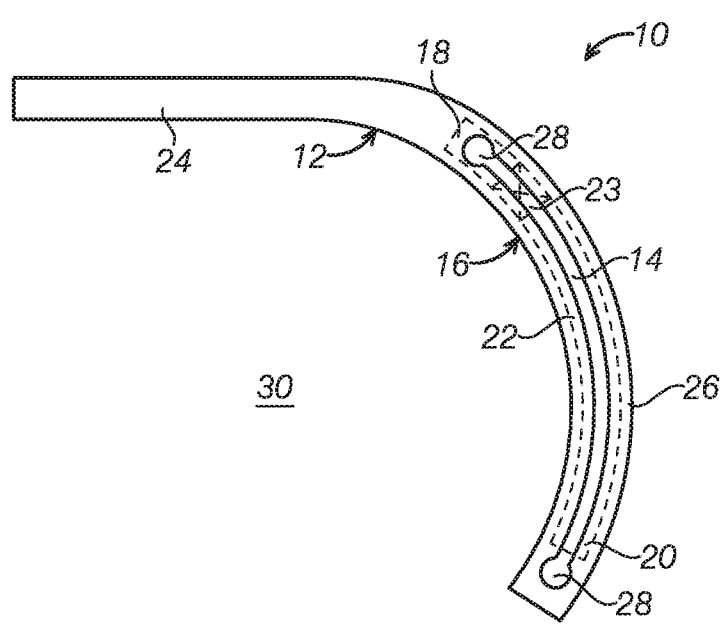
FIG. 6 is a cross-sectional view of a wiring protection device according to one embodiment the present disclosure, illustrating a structure of a sliding block.

Referring to FIG. 6, according to one embodiment of the present disclosure, the second end 18 of the support branch 16 may include a sliding block 23. The support branch 16 is slidable along the guide rail 14 via the sliding block 23. It should be understood that the embodiment shown in FIG. 6 only schematically illustrates the position of the sliding block 23 and there are no limits on the specific structure of the sliding block 23. In other embodiments, the sliding block 23 may take any appropriate structure as long as the sliding block 23 is freely slidable in the guide rail 14.

Referring to FIGS. 2 and 3, according to one embodiment, the two ends of the guide rail 14 include a stop 28 positioned in a path of the sliding block 23, respectively. The stops 28 positioned on the two ends of the guide rail 14 limit the sliding path of the support branch 16 to prevent the support branch 16 derailing from the support base 12, or prevent the support branch 16 from extending an extra length into the support base 12.

According to one embodiment, the support base 12 and the support branch 16 may be made from an integrally formed plastic, respectively. In other embodiment, the support base 12 and the support branch 16 may be made from other materials such metal or alloy.

Referring to FIGS. 1 to 6, the wiring protection device 10 for wiring in a vehicle part comprises a support base 12 and a support branch 16 slidable connected with the support base 12. The support base 12 includes a connection portion 25 to be connected to a first part (e.g., the carpet 34 in the vehicle) and a guide portion (e.g., guide rail) 14. The support branch 16 includes a second end 18 slidable along the guide portion 14, a first end 20 opposite to the second end 18, and a main body 22 between the second end 18 and the first end 20. At least a portion of the main body 22 is extendable to the outside of the support base 12 such that the extended portion of the main body 22 and the support base 12 together contact wiring to restrict its movement.

Referring to FIG. 1 to 6, in some embodiments, the support base 12 may include the connection portion 25 be positioned at the first support segment 24 of the support base 12. For example, the connection portion 25 may be a portion of an outer surface of the first support segment 24 and thus the support base 12 may be connected to the first part (e.g., the carpet 34) via adhesive. In other embodiments, the connection portion 25 may be a connection component attached to the support base 12. For example, the connection portion 25 may be a threaded hole, or a clip to be connected with a corresponding connection component for the first part (e.g., the carpet 34). In addition, the connection portion 25 may also be disposed on different positions of the support base 12, such as on the second support segment 26 or other places.

Thus, the support base 12 may be first connected to the carpet 34 via the connection portion 25. For example, the connection portion 25 may be connected to the carpet 34 via adhesive connection, screw/nut connection, snap connection, or other approaches known in the art. After placing the wiring 32 at a proper place, the support branch 16 may be extended from the support base 12 to form a curved shape at a cross section such as a semi-circular shape or other appropriate shape. The main body 22 of the support branch 16 may extend out the support base 72 with different lengths to accommodate a shape of a cross section of the wiring 32. The support base 12 and support branch 16 at least partially encircles or covers the wiring 32 or contact the wiring 32 to restrain the movement of the wiring 32 and secure the wiring 32 to the carpet 34. Then, the wiring 32 and the carpet 34 together are disposed on the vehicle floor 36 and connected with the vehicle floor using methods known in the art.

As described above, once installed, the support base 12 and the support branch disposed between the carpet and the wiring 32 can protect the wiring 32, and support the carpet 34 to prevent it from collapsing or shaking due to an outside force. Since the support base 12 is slidably connected to the support branch 16, the support branch 16 can be slid to extend a portion of the main body 22 out of the support base 12. In other words, the first end 20 slides to pass the free end 27 of the support base 12. In one embodiment, the first end 20 of the support branch 16 may extend out from the interior of the support base 12. In another embodiment, the first end 20 of the support branch 16 may pass the free end 27 of the support base 12 from the exterior of the support base 12. The second end 18 of the support branch 16 may always remain connected or coupled with the support base 12 or remain inside of the support base 12 to avoid the separation of the support branch 16 from the support base 12 during the installation process. In this way, the support branch 16 and support base 12 together cover the wiring 32, and form a border of the wiring receiving space 30. Thus, if the wiring 32 shakes during the vehicle traveling, the support base 12 and support branch 16 together restrain the wiring 32 to prevent the wiring 32 departing from the designated position. The support branch 16 and support base 12 together can also support the carpet 34 and prevent the carpet 34 from collapsing due to stamping or vibration, and further prevent the carpet 34 touching the wiring 32 to displace the wiring 32.

According to an embodiment, the support base 12 at least may be formed to include a housing to receive the support branch 16, and the guide portion is formed as an inner wall of the housing. That is, the support base 12 encloses at least portion of an outer wall of the support branch 16. According to another embodiment, the support branch 16 may be formed as a housing to receive the support base 12, and the guide portion 14 may be formed as outer wall of the support base 12. That is, the support branch 16 encloses at least portion of an outer wall of the support base 12.

Referring to FIG. 1 to 8, a wiring protection assembly in a vehicle is provided to comprises a vehicle floor 36; a carpet 34; a wiring protection device disposed between the vehicle floor 36 and the carpet 34. The wiring protection device includes a support base 12 connected to the carpet 34, a free end, a guide rail 14, and a support branch 16 slidably connected with the support base 12 The support branch 16 is slidable along the guide rail 14 and at least partially extends outside the support base 12. The support branch 16 and the support base 12 together contact the wiring 32 to restrict the movement of the wiring 32. At a use position, the support base 12 and at least portion of the main body 22 of the support branch 16 form a cross section having a curved shape such as a substantially semi-circular ring. A length of a peripheral of the border of the support base 12 and the support branch 16 at a cross section varies as the support branch extends and retracts from the support base to accommodate a cross section of wiring.

In the embodiment as illustrated above, once installed, the support base 12 disposed between the carpet 34 and the wiring can protect the wiring 32 and support the carpet 34 to prevent the carpet 34 from collapsing or shaking due to an outside force. Since the support base 12 also is slidably connected with the support branch 16, the support branch 16 is slidable in the guide rail 14 during an installation, the support branch 16 and support base 12 together cover the wiring 32 and form a border of the wiring receiving region 30. A length of the border is adjustable via sliding movement between the support base 12 and the support branch 16. Therefore, if the wiring 32 is shaking during the vehicle travel, the support base 12 and the support branch 16 together restrain the wiring 32 to prevent it from departing the designated position. The support branch 16 and support base 12 can also support the carpet 34 to ensure that the carpet does not collapse due to stepping or vibration when in use. As a result, the carpet 34 is prevented from contacting the wiring 32 to move the wiring 32. In addition, the support base 12 and the main body 22 cover at least half the surface of the wiring 32. In this way, with the vehicle floor together, the support base 12 and the main body 12 effectively restrain the wiring 32 from movement.

The following claims particularly point out certain combinations and sub-combinations regarded as novel and non-obvious. These claims may refer to element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A wiring protection device in a vehicle, comprising:
a support base having a fixed end and a free end opposite the fixed end and extending away from the fixed end, wherein the support base includes a guide rail;
a support branch slidably connected to the support base, wherein the support branch includes a first end, a second end and a main body, wherein the first end is adjacent to the free end of the support base at a retracted position, and at least a portion of the main body extends outside the support base at a use position,
wherein an extended portion of the support branch outside the support base and the support base together form a border of a wiring receiving space to accommodate a shape of a cross section of wiring disposed between a first part and a vehicle part at the use position.

2. The wiring protection device of claim 1, wherein the support branch is configured to maintain its shape during sliding process.

3. The wiring protection device of claim 1, wherein the support base includes a first support segment and a second support segment including the free end, and wherein the guide rail is positioned on the second support segment.

4. The wiring protection device of claim 3, wherein at least the second support segment includes a hollow portion as a housing to receive the support branch and the guide rail is formed by an inner wall of the housing.

5. The wiring protection device of claim 3, wherein the guide rail is disposed inside the second support segment.

6. The wiring protection device of claim 3, wherein the second support segment of the support base is curved, and the support branch is a curved member having a same curvature as the second support segment.

7. The wiring protection device of claim 3, wherein the first end and the second end of the support branch include a lock latch, respectively, and the free end of the support base includes a lock catch matching the lock latch.

8. The wiring protection device of claim 2, wherein the extended portion of the support branch outside the support base and the support base form a semi-circular ring at a cross-section to restrict movement of the wiring and wherein the extended portion of the support branch outside the support base is configured to be extended outside the support base at different lengths to accommodate a shape of wiring.

9. The wiring projection device of claim 4, further comprising a sliding block slidably connected with the support branch and configured to slide along the guide rail with the support branch.

10. The wiring protection device of claim 9, wherein the two ends of the guide rail include a stop positioned in a path of the sliding block, respectively.

11. The wiring protection device of claim 1, wherein the vehicle part is a vehicle floor and the first part is a carpet above the vehicle floor.

12. The wiring protection device of claim 1, wherein the first end is configured to be outside the support base at both the retracted position and the use position to serve as a handle to facilitate pulling during assembling or dissembling process.

13. A wiring protection device in a vehicle to protect wiring between a carpet and a vehicle floor, comprising:
a support base including a connection portion adjacent to a fixed end and to be connected to the carpet, a free end opposite to the fixed end and a guiderail; and
a support branch slidably connected to the support base, wherein the support branch includes a main body, a first end adjacent to the free end of the support base at a retracted position and a second end opposite the first end, wherein the first end and at least a portion of the main body extends outside the support base at a use position,
wherein an extended portion outside the support base varies to accommodate wiring disposed between the carpet and the vehicle floor and wherein the extended portion of the support branch and the support base collectively form a border to at least partially conform a cross section of the wiring.

14. The wiring protection device of claim 13, wherein the support base includes a first support segment and a second support segment including the free end, and wherein the second segment includes a hollow portion formed as a housing to receive the support branch, and an inner wall of the housing is used as a guide rail.

15. The wiring protection device of claim 13, wherein the support base is formed from a bended plate, a cross-section of the support base has a J-shape and wherein a width of the support base is configured to cover at least a portion of the wiring along a length of the wiring.

16. The wiring protection device of claim 14, wherein the support branch is formed from a bended solid plate, and where a curvature of the support branch is substantially same as a curvature of the support base to facilitate sliding movement between the support branch and the support base.

17. The wiring protection device of claim 13, wherein the first end of the support branch contacts the vehicle floor at the use position.

18. The wiring protection device of claim 14, wherein the support base and the support branch are made from rigid material.

19. A wiring protection assembly in a vehicle, comprising:
a vehicle floor;
a carpet;
a wiring protection device disposed between the vehicle floor and the carpet, including:

a support base including a fixed end and a connection portion adjacent to the carpet, a free end adjacent to the connection portion, and a guide rail, a support branch disposed inside the support base and slidable along the guide rail, wherein the support branch includes a first end adjacent to the free end of the support base at a retracted position, a second end and a main body between the first end and the second end, wherein the first end and at least a portion of the main body extends outside the support base at a use position, and wherein an extended portion of the support branch and the support base together form a border that at least partially enclose wiring, and a length of a peripheral of the border at a cross section varies as the support branch extends and retracts from the support base to accommodate the wiring, and wherein the cross section of the border is substantially perpendicular to a lengthwise direction of a portion of the wiring received in the wiring protection device.

20. The wiring protection assembly of claim 19, wherein the connection portion of the support based is connected to the carpet via adhesive and the first end of the support branch contacts the vehicle floor at the use position.

\* \* \* \* \*